US006538715B2

(12) United States Patent
Beggiao

(10) Patent No.: US 6,538,715 B2
(45) Date of Patent: Mar. 25, 2003

(54) PHOTO FINISHING SYSTEM WITH PARALLEL CUTTER ARRANGEMENT

(75) Inventor: Vanni Beggiao, Padua (IT)

(73) Assignee: Systel Internatinal S.p.A. (IT)

( * ) Notice: Subject to any disclaimer, the term of this patent is extended or adjusted under 35 U.S.C. 154(b) by 0 days.

(21) Appl. No.: 10/066,929

(22) Filed: Feb. 4, 2002

(65) Prior Publication Data

US 2002/0106207 A1 Aug. 8, 2002

(30) Foreign Application Priority Data

Feb. 8, 2001 (EP) .......................................... 01102775

(51) Int. Cl.[7] ......................... G03B 29/00; G03B 27/52
(52) U.S. Cl. ........................................... 355/28; 355/40
(58) Field of Search ............................. 355/28, 29, 40, 355/41, 46, 77

(56) References Cited

U.S. PATENT DOCUMENTS 5,929,975 A 7/1999 Matsumoto .................. 355/46

FOREIGN PATENT DOCUMENTS

| | | | |
|---|---|---|---|
| EP | 0 628 852 A1 | 12/1994 | ........... G03B/27/32 |
| EP | 0 907 100 A2 | 4/1999 | ........... G03B/27/46 |
| EP | 0 984 326 A1 | 3/2000 | .......... G03D/15/00 |

*Primary Examiner*—Della J. Rutledge
(74) *Attorney, Agent, or Firm*—Pendorf & Cutliff

(57) ABSTRACT

Parallel cutter arrangement for a photographic laboratory, comprising: at least two cutters, each cutter for cutting a received web into print sheets; a feeding device which feeds the received webs to the cutters and the cut print sheets away from the cutters to a collecting station, said feeding device receiving at least two webs, each web bearing a plurality of photographic prints, photographic prints belonging to the same customer order being arranged in a sequence on each web, wherein prints of the same customer order may be present on different ones of the received webs; and a controller which controls the feeding device and the cutter such that, if prints of the same customer order are present on different webs, print sheets belonging to the same customer order arrive at the collecting station without an intermediate print sheet of an other customer order.

11 Claims, 4 Drawing Sheets

PHOTO FINISHING SYSTEM WITH PARALLEL CUTTER ARRANGEMENT

BACKGROUND OF THE INVENTION

1. Field of the Invention

The present invention relates to a photo finishing system with parallel cutters, in particular to a parallel cutter arrangement and to a photographic processing system comprising the parallel cutter arrangement. The invention further relates to a method for parallel cutting webs, to a corresponding program and to a program product comprising the program.

2. Description of the Related Prior Art

Conventionally, a photographer photographs pictures (images) by means of a camera. In this way he captures image information and stores the image information on a suitable storing medium, e.g. on a film in conventional cameras or on a digital memory device (e.g. floppy disk) in digital cameras. The photographer then brings, for instance the storage medium (e.g. film) to a photo shop (peripheral organisation). Alternatively the customer may directly send the digital images together with processing information to a photo shop via Internet. In other words, a photo shop may be a retail shop or a virtual Internet shop. At a photo shop the storing mediums (e.g. films in film cartridges, electronic memory units of digital cameras, etc.) or digital images of several customers are collected and processing information are added concerning the particular processing wishes of the customers (e.g. the format of the photographic prints, type of photographic paper, number of prints per picture (image), adding of a CD with digitalized pictures etc.). Furthermore, the name of the customer is noted or stored and usually an individual order number is assigned to a so-called order or customer order which comprises, for example, a set of digital images or a work envelope with an inserted film cartridge and the working instructions or processing information. In this way, a plurality of "customer orders" together with processing information is collected at the photo shops or virtual Internet shops.

Each photo shop or virtual Internet shop forwards the customer orders to a photographic laboratory (centralised organisation). At this photographic laboratory, each order is processed by processing the photographic images (e.g. film or digital images) of the order according to the assigned processing information (e.g. notes, bar codes, digital information via Internet etc.).

A photographic laboratory, in general, serves a wide area with a large number of photo shops and, therefore, must be fitted out for processing (handling) a large number of orders (up to ten thousands various orders a day). This has been made possible only by a high degree of automation in the laboratory itself, with a consistent necessity to standardise the components used (print format, envelopes etc.). A drawback of this standardisation is that individual wishes or information of the customer may not be fulfilled.

If a customer requests to print the images of a customer orders in different formats, which may not be reproduced by a web of particular width, the handling of those customer orders is very complex according to the prior art.

If, for instance, three webs of different width are necessary in order to fulfil the requests of the customer, for instance, the following workflow is necessary in a photographic laboratory according to the prior art. The films (customer orders) are combined to batches, which include a plurality of customer orders. Such a batch is input in a printer, which prints (selected) images on a web having a first width. Then the web is forwarded to a cutter, which cuts the web into a plurality of print sheets, which belong to a plurality of different customer orders. Then the batch is input into a second printer, which prints (selected) images on a web of a second width in order to produce prints of a different format. Then this web of a second width is cut in order to produce a plurality of print sheets of different customer orders. Finally, the batch is input in a third printer and prints the images on a web of third width, which is thereafter cut into a plurality of print sheets. Thus, finally, there are a plurality of print sheets of a first format printed on a web of a first width, a plurality of print sheets of a second format printed on a web of a second width and a plurality of print sheets of a third format printed on a web a third width. Thus, in summary, there are three large sets of print sheets, each set comprising print sheets of a plurality of customer orders. An operator has then to identify the print sheets, which belong to the same customer order and to sort the print sheets in accordance with a predefined sequence. This kind of processing of the customer orders is very time-consuming and often provokes an unintended mixing of print sheets of different customer orders.

SUMMARY OF THE INVENTION

The object of the invention is to provide a photographic finishing system, which facilitates and accelerates the processing of photographic images of a customer order, which have to be printed in different formats.

A particular advantage of the present case is that the processing of customer orders or the photo finishing process is not only accelerated when the customer order comprises images, which are to be printed on webs of different widths but is also accelerated when the images of a customer order are to be printed all in the same format. The latter advantage is due to the parallel processing of images of the same customer order in parallel processing branches or pathways.

According to the present invention, a parallel cutter arrangement is provided. The parallel cutter arrangement comprises at least two cutters. These cutters are preferably arranged in parallel, which means that one web may be cut by one cutter, while another web is cut by another cutter. In other words, the time interval needed to cut one web by one cutter may overlap another time interval needed to cut another web by another cutter. The cutters may be one-dimensional (one-directional) cutters (X cutter) or two-dimensional (two-directional) cutters (X-Y cutter).

The parallel cutter arrangement further comprises a feeding device, which feeds in parallel webs to the cutters and conveys in parallel the single sheets (print sheets), which have been separated from the web by the cutter to a collecting station. At the collecting station the print sheets may be collected or sorted manually or automatically.

The parallel cutter arrangement of the present invention is designed to process webs, wherein the prints, which belong to the same customer order, are arranged in a sequence on the web. In other words, there are no prints of another customer order between prints of a particular customer order on a web. However, the prints, which belong to one and the same customer order, may be distributed among different webs. Assuming the customer wants to print sheets in accordance with a sequence (target sequence) which corresponds to the receive sequence of images (customer order sequence). If, for instance, the customer order comprises ten prints 1, 2, 3, 4, 5, 6, 7, 8, 9, and 10 originally received in accordance with their numberings, i.e. print 1 at first and print 10 at last, the prints 1, 5, 9, and 10 may be arranged in this sequence on a first web. Thus the sequence 1, 5, 9, and 10 of the first web (first web sequence) does not violate the customer order sequence, i.e. 1, 2, 3, 4, 5, 6, 7, 8, 9, and 10.

The prints 2, 4, and 7 may be arranged in this sequence on a second web. Again the customer order sequence is not violated by the second web sequence, i.e. 2, 4, and 7.

The remaining prints 3, 6, and 8 may be arranged in this sequence on a third web. Again the customer order sequence is not violated by the third web sequence, i.e. 3, 6, and 8.

The first, second and third web may have different widths but may also have the same width or some of the webs may have the same width while other webs have a different width.

The parallel cutter arrangement of the present invention comprises a controller, which controls the feeding device and the cutter such that the prints of the same customer order even if distributed on different webs are kept together or are nested. In other words, the prints of the same customer order arrive one after the other from the different cutters at a collecting station such that there is no print sheet of another customer order between those sheets. Thus, print sheets of a customer order purely arrive at the collecting station without any "contamination" of a print sheet of another customer order. In this way, collecting of print sheets of a customer order may be easily performed by an operator or a stacking or sorting machine, without unwanted mixing of print sheets of different customer orders.

As mentioned above, the print sheets are arranged on the web according to a web sequence, which preferably does not violate target sequence. The target sequence may for instance correspond to the customer order sequence or any other sequence, which is defined by the processing information and/or determined by the controller, which, in turn, is assigned to the customer order. In this way, the print sheets arrive at the collecting station via separate branches or pathways in accordance with respective web sequences, which easily allow arranging the print sheets in accordance with the target sequence.

In order to determine a target sequence for the prints at the collector, the controller preferably refers to the processing information, which is assigned to each customer order. Preferably the controller controls the web sequences such that they do not violate the target sequence, i.e. any print A which is before a print B in the web sequence and after a print C in the web sequence is before that print B and after that print C in the target sequence. The target sequence may correspond to the original customer sequence.

Preferably the feeding device and the cutters are arranged such that they constitute parallel feeding and cutting pathways. The feeding and cutting pathways extend from the web reception location through or via the cutters to the collecting station. The parallel feeding and cutting pathways allow a parallel cutting of the webs by the cutters. In particular print sheets of the same customer order may be separated from different webs within overlapping time intervals, e.g. simultaneously or in an interleaving way. For this purpose, the controller controls the feeding device and the cutters such that the webs and the print sheets are conveyed in parallel on the parallel feeding and cutting pathways. This parallel conveyance is preferably performed if prints of the same customer order are present on different webs.

Preferably the controller receives processing information, which defines for each print to which customer order the print belongs. The processing information may additional define the sequence of the prints in a customer order. For instance, the processing information may define the position of each image and thus of the corresponding print in the sequence of images or prints of a customer order and/or may define the above-mentioned target sequence at the collector. The controller may receive the processing information and/or may determine the processing information. The determination of processing information may be performed by the controller by identifying, for instance, marks or markings on the prints. The marks may be, for instance, bar codes, which identify for each print to which customer order the print belongs. Additionally the bar code may identify the position of the print in the sequence of prints of a customer order. The controller may also receive some part of the processing information and may determine another part of the processing information. For instance, the controller may receive information that the next four prints on web number 2 belong to a particular customer order. Additionally the controller may determine by means of sensors the start of this sequence on the web number 2 and may identify by means of each sensor the position of each print on the web.

Preferably the processing information defines not only for each print to which customer order the print belongs, but also a target sequence, which defines a preferred sequence of the print sheets for each customer order. Additionally the controller may receive and/or determine web sequences, which define for each web the sequence of prints of the respective customer orders. The web sequences may be determined by the controller based on the target sequences such that the web sequences do not violate the target sequences as explained above.

The controller performs the feeding of the webs, the cutting of the webs into print sheets and the conveyance of the print sheets to the collecting station in a parallel way such that the print sheets arrive at the collector in a sequence, which corresponds to the target sequence. This control is performed based on the web sequence for each pathway such that the arrival sequence of the print sheet having a particular position in the customer sequence at the collecting station corresponds to the target sequence.

In the example given above, the web 1 is processed by the first pathway to deliver the print sheet 1 as the first print sheet at the collecting station. The web 2 is processed at the second pathway to deliver the print sheet 2 at the collecting station after the print sheet 1 has arrived. The web 3 is processed at the third pathway to deliver the print sheet 3 at the collecting station after the print sheet 2 has arrived. Thereafter the web 2 on the second pathway is processed to deliver the print sheet 4 at the collecting station after the print sheet 3 has arrived, and so on.

(Additional) processing information for determining the location of the prints or print sheets in the process flow at least approximately may be determined by the controller in a plurality of ways. The (additional) processing information may be determined based on the timing of transport of the webs and the corresponding print sheets. Preferably the transport of the web and the corresponding print sheets is under strict control of the controller. In this way, the controller knows at any time the position of the web and of the print sheets. This allows the controller to determine the position of each print in the parallel pathways. Thus the controller may control the feeding and cutting in order to meet the above defined demands based on the (additional) processing information.

Alternatively or additionally the controller may identify the prints and webs, e.g. based on an optical identification or based on sensors. For instance, the width of the webs may be detected in order to identify the webs. Alternatively the sections of the web, which separate the prints from each other, may be optically identified. Thus, the prints on the webs may be counted and the prints may be assigned to the customer orders.

Alternatively or additionally, the controller may receive information about which prints are present on which web. By identifying the web and counting the prints, each print may be assigned to the respective customer order and the position of the print is in a sequence may be determined.

The processing information, which allows to identify the prints and to assign the prints to the different customer orders may additionally be collected based on a control of the cutters. Each cutting action corresponds to a separation of prints. In this way, the prints and print sheets may be counted and monitored.

Furthermore, the feeding device and the cutter may issue signals about the conveyance of the webs and the print sheets and about the cutting action. These signals may be processed by the controller in order to determine the processing information or to complement the processing information, e.g. to determine the location or status of the respective prints or print sheets.

As already mentioned above, there may be marks on the webs and/or print sheets and/or prints, which allow identifying the webs, prints and/or print sheets. The marks may be placed on the web by means of printers. The controller may communicate with the monitoring device, which identifies the marks in order to determine the position of the prints or print sheets and in order to determine which print sheets belong to which customer order.

The web sequences, which define the sequence of prints of one order on the same web, may be determined based on the processing information. If, for instance, the processing information includes information about the distribution of prints of the same customer order on different webs, the corresponding web sequences may be determined based on this information. Alternatively or additionally, the prints may, for instance, be directly identified by means of marks. In this way the sequence of the prints on the web and thus the web sequence is determined. Of course, the controller may receive additionally or alternatively information on web sequences from external, e.g. from a system of printers, which print the images of one and the same customer order on different webs. The print sheets of each web are separated from the web in accordance with the web sequence. Preferably the print sheets are separated by the different cutters from the different webs in a sequence, which corresponds to the target sequence. In the example given above, the print 1 is first cut from the web 1. Then the print 2 is cut from the web 2. Then the print 3 is cut from the web 3 and then the print 4 is cut from the web 2 and so on.

The cutters may be cutters, which cut only in one direction (one-dimensional cutters) or which cut in two or more directions. Cutters which cut in one direction are called X cutters and cutters, which cut in two orthogonal directions are called X-Y cutters.

According to a particular embodiment, there is a number of one directional cutters and a number of two-directional cutters. Preferably one two-directional cutter is assigned to the web having the broadest width. This allows for a flexible handling of the distribution of images to different webs. The two-directional cutter preferably cuts in a direction perpendicular to the transport direction of the web and in a direction parallel to the transport of the web. In this way two or more prints may be arranged besides each other in transport direction and may be separated by the X-Y cutter. This allows for a more flexible use of the printers, which print the images on webs of different widths as will be explained in more detail below. In particular a higher throughput of images may be achieved.

The present invention further pertains to a photographic processing system, which comprises one of the above-described embodiments of the parallel cutter arrangement.

The photographic processing system comprises an input device, which receives customer orders and the processing information assigned to the customer orders. The customer orders may be received, for instance, as a batch of films spliced together or as a series of digital photographic images. The digital photographic images may be directly received via a network (e.g. Internet) or may be received from a scanner, which scans films. Each customer order comprises a number or plurality of photographic images (digital images or images on a film). Before printing, the customer order corresponds to a set of photographic images. After printing, the customer order corresponds to a set of prints and after cutting the customer order corresponds to a set of photographic print sheets.

The photographic processing system further comprises a printer system, which receives the photographic images (e.g. as digital images or on a film) and which prints the photographic images on more than one web. The printing on different webs may be performed in parallel or in a sequence or in a combination thereof.

The photographic processing system further comprises a transport device, which transports or conveys the webs, on which the images have been printed, to the parallel cutter arrangement. If the printer system comprises printers arranged in parallel, the webs are transported preferably in parallel to the parallel cutter arrangement. Preferably each of the cutters of the parallel cutter arrangement is assigned to one particular printer, which prints the images on webs of particular width.

If the printer system comprises a printer (sequential printer), which prints on webs of different width in a sequence, then preferably the webs of different width are distributed by the transport device on parallel transport lines, which lead to the parallel cutter arrangement. Preferably each transport line is for transporting a web of particular width. In order to achieve a parallel arriving of prints of the same customer order at the parallel cutter arrangement in case of a sequential printer, the transport of webs may preferably be delayed or buffered on the parallel transport lines. The delay time is preferably controlled by the controller such that those web sections, which belong to the same customer order, arrive at least approximately simultaneously at the parallel cutter arrangement or at the cutters of the parallel cutter arrangement.

As mentioned above, the webs used by the printer system may be of different width. However if, for instance, the processing information of a customer order requests only prints of the same format then, in case of parallel arrangement of printers, the printers may be used to parallel print on webs of the same width in order to accelerate the printing. Thereafter, the prints of the same customer order may be cut in parallel, in order to further accelerate the processing of the prints.

Furthermore, preferably, the distribution of the photographic images to the different printers is not only based on the requested format of the images, but also based on the printing speed achievable with the different printers and the format printing ability of the different printers. If, for instance, a printer prints on a web of particular large width, this printer may not only be used to print large format prints but may also be used to print images of small format. These small format images may be nested on the web of large width and may be cut by a two-directional cutter as mentioned above. Depending on the number of large format and small format prints of a customer order, the photographic images may be flexibly distributed between a printer for small format and a printer for large format such that the throughput of images is optimised. If, for example, the number of large format prints is below a certain threshold, then the printer for large format prints is additionally be used to print images of small format in order to increase the overall throughput.

Preferably the number and speed of the printers, which are arranged in parallel is adapted to the statistically occurrence of customer requests for prints of a certain format. There are more printers for printing the most wanted format and/or those printers have a higher printing speed than other printers, which are for printing less wanted formats. This layout of the printer system adapted to the statistically requests of the customers allows for a further optimisation of the photographic processing system in terms of throughput. A flexible adoption to customer wishes may be achieved by one large format printer in combination with a two-directional cutter and/or in combination with a printer, which allows to print on webs of different formats. The printing system may also be combined with at least one single sheet printer, which is able to print on media sheets (e.g. sheets of photographic paper) of various formats. These single sheets may then be conveyed by the transport device such that they arrive together with other prints of the same order at the collection station within the same time frame. The other prints of the same order may have been printed in a usual way by one or more printers on one or more webs of the same or different width. The web or the webs are cut by a cutter or by cutters, in particular by the parallel cutter arrangement. The corresponding single sheets of the other prints of the same order arrive within the same time frame at the collecting device as the prints from the one or more single sheet printers.

According to the invention, a system, which comprises a printer and a cutter (printer and cutter system) may comprise a printer, which prints the images on a web and a cutter, which cuts the web thereafter and/or may comprise a single sheet printer, wherein a web is cut into single sheets and then the images are print on the single sheets. According to the invention, the printer and cutter system is controlled such that a printing of prints of the same customer order and/or the output of prints of the same customer order is performed within the same time frame or in an overlapping manner. In particular, the print sheets, which are output in parallel, are output such that print sheets of the same customer order arrive at the collecting station without intermediate print sheet of another customer order.

The present invention also relates to a method, which performs the above-mentioned steps in order to achieve a group wise arrival of print sheets of different customer orders. In a first step the webs are preferably parallel received and cut into print sheets. Alternatively or additionally single print sheets may be received via a parallel transport pathway, which print sheets bear images of the same customer order. In a next step, the print sheets, which are present on parallel transport pathways, are feeded to a collecting station such that print sheets of the same customer order arrive at the same time or within a time range, which is not interrupted by the arrival of print sheets of another customer order.

The collecting of the print sheets at the collector may be performed automatically or manually by an operator.

The invention further relates to a program, which performs automatically the aforementioned method, when the program is loaded into a computer or when the program runs on a computer. The computer preferably interacts via control interfaces with cutters and transport devices. The transport devices are for feeding webs to cutters. In particular, the transport devices allow for a parallel transport of print sheets to the collecting station.

The invention also relates to a photographic processing method, where received customer orders and assigned processing information is processed in order to produce print sheets, which processed in accordance with the assigned processing information and in particular sorted in accordance with a target sequence. The target sequence may be, for instance, in accordance with the sequence of the images in the received customer order and/or in accordance with the format of the images defined by the processing information. For instance, prints of largest format are first and prints of smallest format are last and the sequence of prints having the same format does not violate the customer sequence. In accordance with the photographic processing method, the photographic images of the customer orders are printed on webs, fed to at least two parallel cutters, which cut the webs into print sheets, and the print sheets are fed in parallel to the collecting station in order to achieve the group wise arrival of print sheets of the different customer order.

The invention further relates to a program, which performs the photographic processing method and which may for instance be distributed via Internet.

Finally the invention relates to a program product like a computer media (CD, floppy disk, SRAM etc.), which stores or comprises the above-mentioned programs.

BRIEF DESCRIPTION OF THE DRAWINGS

In the following preferred embodiments of the invention are described. In connection therewith, further features of the invention are disclosed. Different features of different embodiment may be combined.

DESCRIPTION OF THE PREFERRED EMBODIMENTS

Figure 1:
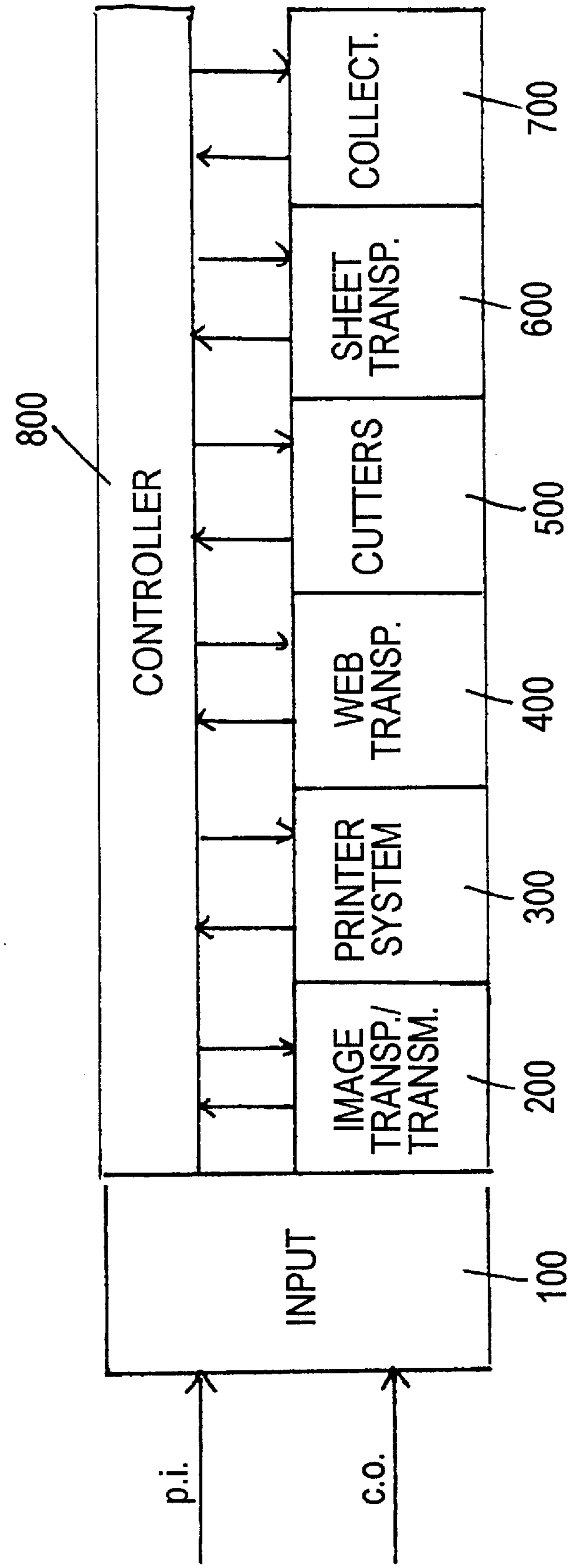
FIG. 1 shows an embodiment of an overall photographic processing system in accordance with the invention in order to illustrate the interaction with a controller.

FIG. 1 shows a photographic processing system according to the present invention. Customer orders (c.o.), which comprise a plurality of photographic images are input in the input device 100. Additionally to customer orders, the processing information (p.i.) is input into the input device 100. The input device may consist of separate units, for instance, one unit specialized to receive the processing information and another unit speicialized to receive the customer orders or may be realized as one unit, which may receive both processing information and customer order. The customer orders may be received in digital form or in physical form. If the customer orders are received in physical form, e.g. as a batch of films, the photographic images are preferably scanned in order to digitalize them. The digitalized images may then be digitally transferred to the printer system. Alternatively to the preferred transfer of digital images to the printer system, there may be a physical transport of films or batches or film sections or batch sections to the printer system.

Additionally and preferably parallel to the customer orders, the input device 100 receives processing information, which is assigned to the customer orders and which defines at least the format, in which the photographic images have to be printed. The processing information is preferably transferred from the input device 100 to the controller, which may be a computer system or workstation or personal computer. The input device 100 may be an interface like a network card or a modem, which may be part of the computer system and which receives the processing information, e.g. via local network or via Internet.

Preferably the controller controls via the input device the transfer or transport via a transmission line 200 or transport device 200 to a printer system 300. Embodiments for printer systems will be discussed in more detail in connection with FIGS. 2, 3, and 4.

FIG. 1 relates to the preferred embodiment, where the printer system prints the photographic images on webs. The webs are transported by web transport device 400 to cutters 500, which cut the webs into print sheets. If the printer system uses a printer to print on single sheets, a web transport device and a cutter is not necessary for this single sheet printer.

The single sheets or print sheets are transported by the sheet transport device 600 from the cutters to the collecting station 700. At the collecting station 700, print sheets belonging to the same customer order are collected together. For instance, the print sheets of the same customer order are put into an envelope. The processing at the collecting station may be performed automatically, semi-automatically or manually. In particular an automatic sorting in accordance with a target sequence may be performed.

The controller 800 controls the input device 100, the image transport/transmission device 200, the printer system 300, the web transport device 400, the cutters 500, the sheet transport device 600, and the collecting station 700. This control is indicated by arrows between the controller and the different devices.

In case of a pure digital reception of the digital images, the input device 100, the image transmission device 200 and the controller 800 is preferably part of a computer systems. The arrows from the different devices to the controller indicate that the devices communicate with the controller in order to give the controller feedback to monitor the flow of images through the different devices. The images may be present purely in digital form or may be present physically on films (negative or positive) at the input device 100 and the transport device 200. The images are in physical form at the web transport device 400, the cutters 500, the sheet transport device 600 and finally at the collector. The prints may be a part of the web (before the cutter) or may be present on single print sheets (after the cutter).

Figure 2:
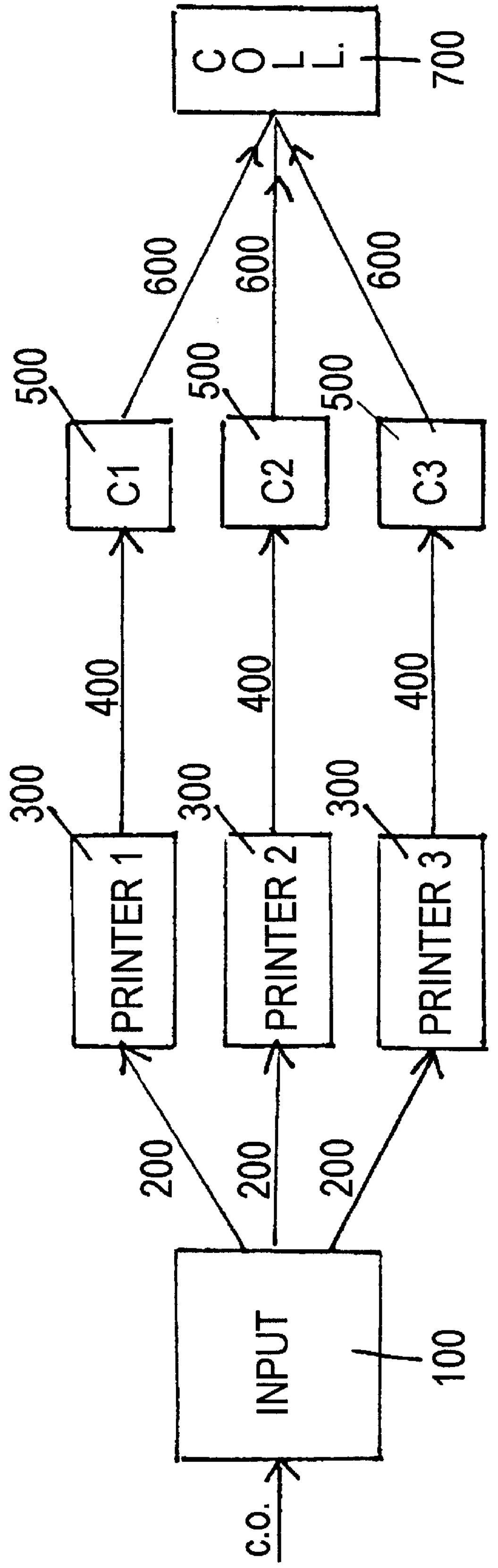
FIG. 2 shows a part of the embodiment of FIG. 1 in more detail.
Figure 3:
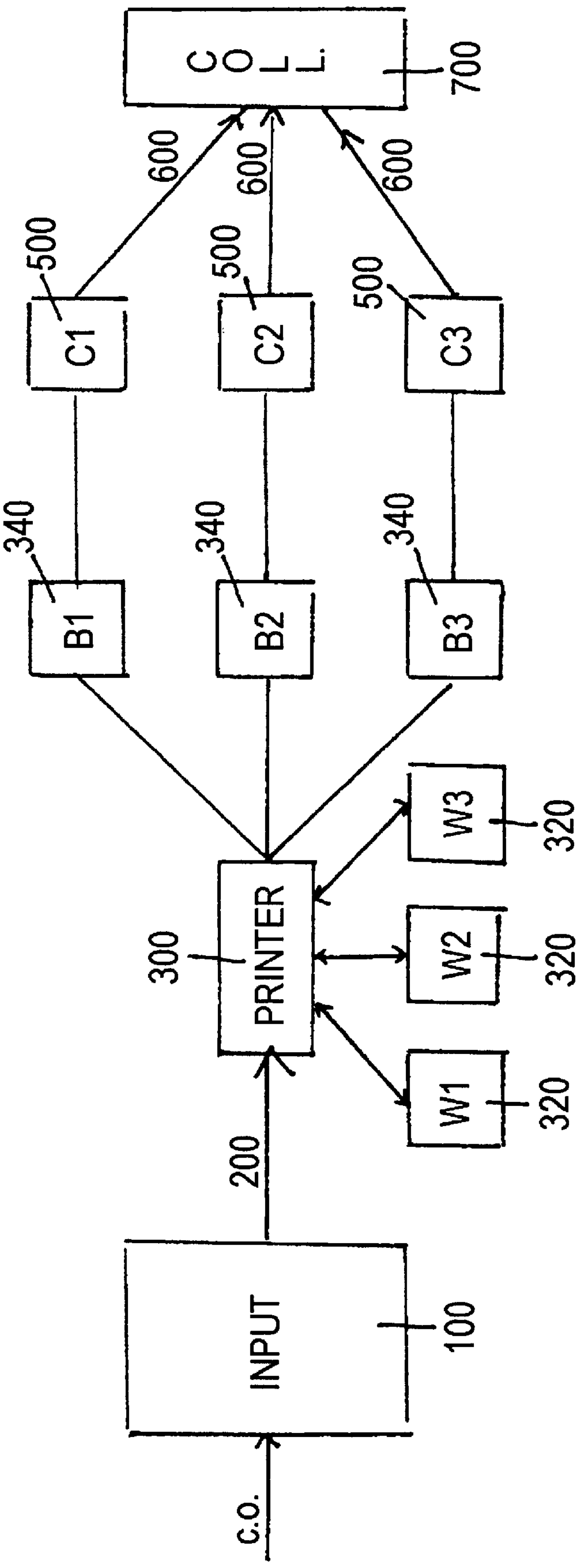
FIG. 3 shows a part of the embodiment of FIG. 1 in more detail in accordance with another embodiment than FIG. 2.
Figure 4:
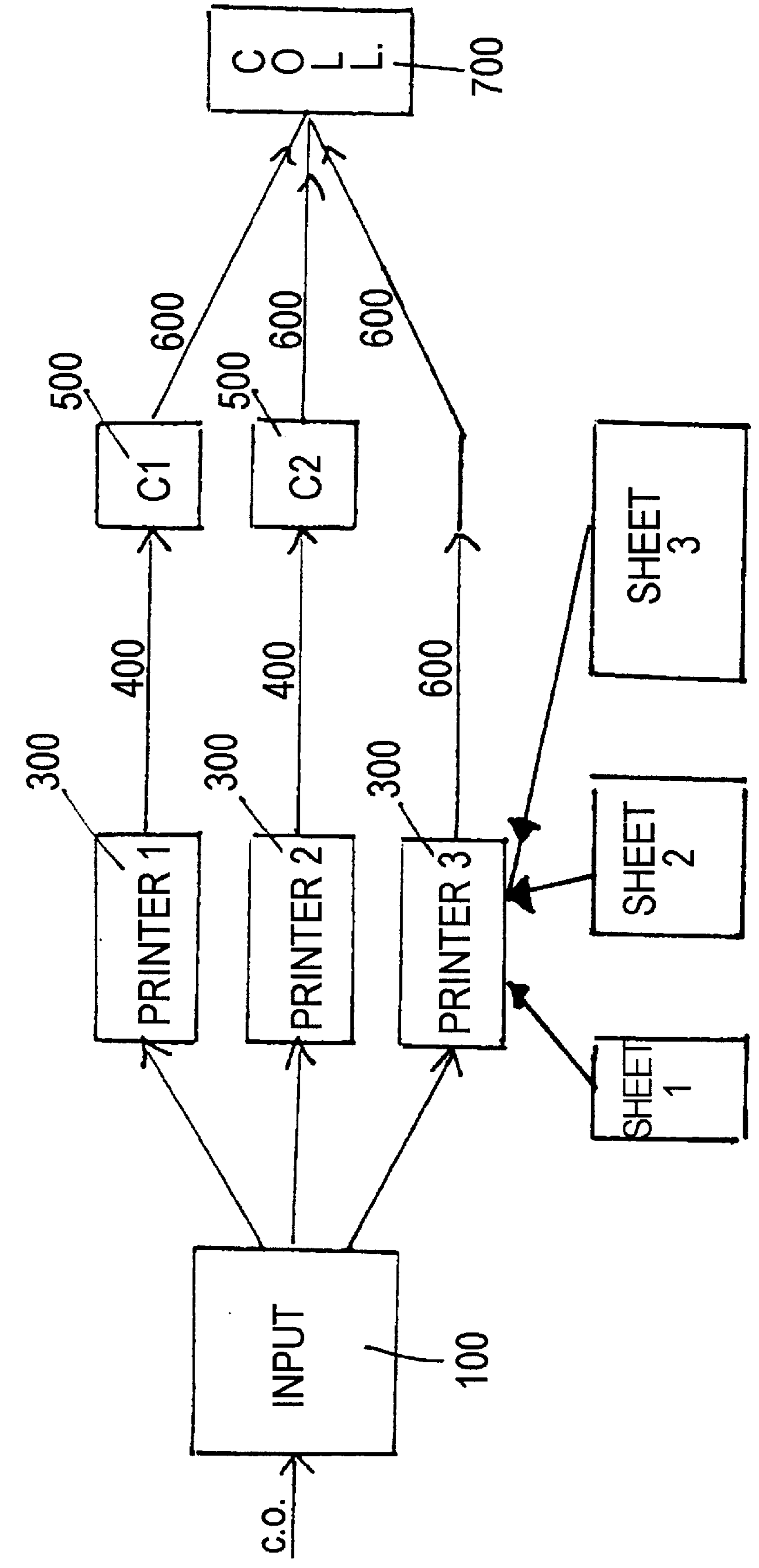
FIG. 4 illustrates still a further embodiment of the present invention.

In connection with the following figures it is illustrated, in which way the controller controls the different devices by illustrating the internal flow of the images through the processing system of the present invention in FIGS. 2 to 4. Since the controller preferably interacts with all devices shown in FIGS. 2 to 4, the controller and the different communication pathways are not shown in the FIGS. 2 to 4 in order to not obscure the principals of the present invention by showing a plurality of communication lines.

FIG. 2 shows the flow of images through the processing system according to the present invention. The customer orders (c.o.), which include a plurality of images are input in the input device 100. The input device 100 distributes the images among parallel printers 300. The distribution is performed via the transmission lines 200 in case the images are in digital form. If the images are not in digital form but in physical form (films), the images may be distributed by cutting the films into sections and distributing the cut sections via transport lines 200 to the printers 1, 2, and 3.

The controller performs the distribution of the images among the printers. The distribution is preferably controlled based on the processing information. Additionally optimising rules may be applied in order to optimise the throughput of the images through the processing system. For instance, each printer may be assigned to particular formats of prints; for instance, the printer 1 is for printing 4×6 inch prints. The printer 2 is for printing 5×7 inch prints and the printer 3 is for printing 8×12 inch prints and 12×18 inch prints. Printer 1 may print prints on a web of 4-inch width. The printer 2 may print on a web of 5-inch width and the printer 3 may print on a web of 12-inch width. Depending on the format, the images of one and the same customer order are distributed among the printers 1, 2, and 3. The webs of the respective width are forwarded via a web transport device 400 to cutters 500, which are designated C1, C2, and C3 in FIG. 2. Preferably the controller controls the printers and the web transport device such that the images of the same customer order arrives within a time interval at the cutters C1, C2, and C3. This time interval does preferably not overlap with the arrival time interval of images of other customer orders.

The webs are cut by the cutters C1, C2, C3 into print sheets and the print sheets are transported via the sheet transport device 600 to the collecting station 700. Preferably, the print sheets arrive at the collecting station 700 within a time interval or time frame. This time interval does preferably not overlap with the arrival time interval of print sheets, which belong to other customer orders.

The embodiment of FIG. 2 allows for a fast and flexible processing of customer orders even if the customer requests different print formats, which may not be print on a web of a single width. Preferably those printers, which print the formats, which are most frequently requested by the customers, are high-speed printers, which print the images with a higher speed than other printers, which handle not so frequently requested formats.

The printer system of FIG. 2 may alternatively or additionally be used in order to increase the throughput in comparison to processing systems, which use only one printer. In this case, for instance, the printers 1 and 2 may print on webs of the same width, preferably of such a width which is most frequently needed.

Flexibility may be added to the system, if the controller does not only base the control on the processing information but on additional optimising rules. If, for instance, the processing information of some customer orders request a mix of formats and the processing information of other customer orders request only one format, the controller may perform a different kind of distribution rule in order to distribute the images among the printers. In the first case, the controller may distribute the images in accordance with the format request. In the second case the controller may distribute the images based on the printing speeds of the different printers such that images of the same customer order are output nearly simultaneously from the printers. In other words, a printing speed adapted distribution is performed. Of course, both distribution principles may be combined. Preferably the controller analyses the format requests of processing information assigned to a plurality of customer orders which are to be processed in a sequence and performs the distribution such that the overall throughput of the plurality of customer orders is optimised.

In order to achieve prints of a requested format, if the images are distributed to printers, which print on webs of too large width, the printers may be combined with two-directional cutters, which allow to tailor the print sheets to the requested format. In this way a flexible system, which allows to print prints of various format and which has an optimised throughput can be achieved.

FIG. 3 shows another embodiment of the present invention, which may be combined with the embodiment of FIG. 2. As in the other figures the same reference signs pertain to the same or similar devices.

As in the previous described embodiment, the customer order is input in the input device 100. From the input device the images are transferred via the transport device 200 to the printer 300. The sequential printer 300 has the particular feature that the printer may print the images on webs of different format. For this purpose the webs of different format W1, W2, and W3, which are stored in web providing devices 310, 320, and 330, may be loaded into the sequential printer 300. Assuming, a series of images arrives at the printer 300; the controller preferably sorts the images in accordance with the format, in which they are to be printed. The printer 300 then prints in a succession the set of images on the webs W1, W2, and W3, each set pertaining to the same customer order but to a different format. The sequential printer 300 of FIG. 3 may be arranged in parallel to the printers 300 of FIG. 2. The output of the sequential printer 300 of FIG. 3 may be connected with all cutters C1, C2, and C3 of FIG. 2 or with some of these cutters.

Preferably the sequential printer 300 prints sets of images of the same format and belonging to the same customer order on a web in a sequence, which is not interrupted by prints of other customer orders. In order to avoid an often change of webs; preferably sets of images of different customer orders are printed on one web of particular format in a sequence. Thereafter, sets of images belonging to other customer orders and having a different format are printed on a web of a different width. For this purpose, the controller preferably comprises storage for storing the images of a plurality of customer orders.

If one of the webs is fully printed with images of different customer orders, then the web is conveyed to a buffer 340. The respective buffers are designated as B1, B2, and B3 in FIG. 3.

After the first web W1 is fully printed with images, the second web W2 is loaded into the sequential printer 300. The second web W2 is printed with images of a different format. If the web W2 is filled with prints of different customer orders, the web W2 is forwarded to the buffer B2. In a third step the web W3 is loaded into the printer 300. After the web W3 is filled with prints of a third format, the web W3 is conveyed to the buffer B3. At this step of the procedure, the buffers B1, B2, and B3 each comprise a web of different width and filled with prints of different format and of different customer orders. The controller has controlled the printing process such that prints of the same format and of the same customer order are arranged in a sequence. Furthermore the controller has controlled the printing process such that the sequence of customer orders on each web W1, W2, and W3 is the same.

In a next step, the webs W1, W2, and W3 are respectively conveyed to the cutters C1, C2, and C3. Only those sections of the webs W1, W2, and W3 are preferably cut in parallel, which belong to the same customer order. Alternatively or additionally there may be provided a buffer after the cutters C1, C2, and C3. In any case the controller controls the output from the buffers 340 to the cutters 500 via the sheet transport device 600 such that print sheets of the same customer order arrive within the same time interval at the collecting station 700.

The above-mentioned storage for storing a plurality of customer orders may be a digital storage like a hard disk or optical disk, in case the images output from the input device 100 are digital images. If the images are present on physical films or other physical photographic media, a storage device for the different media sections is provided, which allows for a selective accession of media sections in order to print the images depending on the requested format on the different webs W1, W2, and W3. As mentioned above, a particular aspect of the embodiment of FIG. 3 is that only those images of a customer order are print on the same web, which are assigned to a particular format or to particular formats. Images of other customer orders assigned to the same web width are printed on the same web. The printing process on one and the same web is preferably not interrupted by the printing of the other images of the customer orders on webs of different width. Thus the storing of the images of a plurality of customer orders allows for a flexible printing of different formats, while a high speed printing process is available.

The sequential printer shown in FIG. 3 may also be used in connection with only one cutter instead a plurality of cutters. This one cutter is able to cut webs of different width. After this one cutter, buffers may be provided, each buffer for one format. Prints of the same customer order are forwarded from the buffers to a collector such that prints of the same customer order arrive at the collector without intermediate print of another customer order.

FIG. 4 shows a further embodiment of the present invention, which may also be combined with the embodiment of FIG. 3 and/or with the embodiment of FIG. 2. One of the printers of the embodiment of FIG. 2 is replaced by a single sheet printer. Since the single sheet printer 3 already issues print sheets, the cutter C3 may be omitted.

The single sheet printer 3 may be flexibly and selectable fed with sheets 1, 2, and 3 of different format. In this way the single sheet printer 3 adds flexibility to the processing system shown in FIG. 4. The single sheet printer 3 can bear the task to print prints of rare format. In view of this the printing speed of the single sheet printer 3 has not to be so high as the printing speed of the web printers 1 and 2. The sheet transport from the printer 3 to the collecting station 700 by means of the sheet transport device 600 is controlled by the controller such that the print sheets belonging to the same customer order arrive in the same time interval at the collecting station 700.

The controller distributes the photographic images belonging to the same customer order among the different printers 1, 2, and 3 in FIG. 4 in the same way as described above in connection with FIG. 2.

The arrangement of FIG. 4 may only comprise one cutter.

What is claimed is:

1. Parallel cutter arrangement for a photographic laboratory, comprising:

at least two cutters, each cutter for cutting a received web into print sheets;

a feeding device which feeds the received webs to the cutters and the cut print sheets away from the cutters to a collecting station, said feeding device receiving at least two webs, each web bearing a plurality of photographic prints, photographic prints belonging to the same customer order being arranged in a sequence on each web, wherein prints of the same customer order may be present on different ones of the received webs; and a controller which controls the feeding device and the cutter such that, if prints of the same customer order are present on different webs, print sheets belonging to the same customer order arrive at the collecting station without an intermediate print sheet of an other customer order.

2. Parallel cutter arrangement according to claim 1, wherein a) the feeding device and the cutters constitute parallel feeding and cutting pathways which run from the location where the webs are received over the cutters to the collecting station and which allows a parallel cutting of the webs by the cutters, and b) wherein the controller controls the feeding device and the cutters such that, if prints of the same customer order are present on different webs, the prints belonging to the same customer order but being present on different webs are separated from the webs by means of the cutters within overlapping time intervals.

3. Parallel cutter arrangement according to claim 2, wherein target sequences define the succession according to which the print sheets of respective customer orders should be arranged at the collector and web sequences define for the prints of the same customer order the sequence of the prints for each of the webs on which they are distributed;

wherein, in case prints of the same order are distributed on different webs and the different webs are distributed in parallel on the parallel different feeding and cutting pathways, the controller controls in parallel the pathways in accordance with the corresponding web sequence such that the print sheets arrive at the collector in a sequence which matches the target sequence.

4. Parallel cutter arrangement according to claim 1, wherein the controller performs the control a) based on received processing information which is assigned to the customer orders, said processing information defining target sequences and/or web sequences or allowing the determination of target sequences and/or web sequences;

b) based on the timing of conveyance of the webs and/or prints, c) based on identification and/or counting of the webs and/or prints, d) based information on which web the respective prints are present, e) based on information from optical sensors which monitor the webs and/or the prints on the webs and/or the print sheets, f) based on sensors which monitor the cutters, g) based on signals from the feeding device and/or from the cutters, and/or h) based on the monitoring of identifying marks on the webs and/or prints.

5. Parallel cutter arrangement according to claim 1, wherein at least two of the webs cut by cutters have different width.

6. Parallel cutter arrangement according to claim 1, wherein at least one of the at least two cutters is adapted to cut a web of a particular width along one direction and/or at least one of the at least two cutters is adapted to cut a web along two orthogonal directions.

7. Photographic processing system for processing photographic images in a photographic laboratory comprising the parallel cutter arrangement of claim 1, and further comprising:

a) an input device which receives customer orders and the processing information assigned to the customer orders, the customer order comprising photographic images, b) a printer system which receives the photographic images and which prints the photographic images on webs, and c) a transport device which transports the webs to the parallel cutter arrangement.

8. Photographic processing system according to claim 7, wherein the printer system comprises at least two printers arranged in parallel each printing on a web the width of which being different and/or comprises at least one printer which may be loaded with webs of different width in a sequence.

9. Photographic processing system according to claim 8, wherein said processing information defines the format in which the photographic images are to be printed, said controller selects for each print a web of suitable width out of available widths based on the format defined for each print and controls the printer system to print each print on the web of selected width.

10. Photographic processing system for processing photographic images in a photographic laboratory comprising:

a) an input device which receives customer orders and the processing information assigned to the customer orders, the customer order comprising photographic images, b) a printer and cutter system which receives the photographic images and which prints the photographic images on photographic media and outputs print sheets, wherein said printer and cutter system is capable or outputting print sheets of the same customer order in parallel and c) a conveyor which transports the print sheets to a collecting station, wherein a controller controls said printing of images of the same customer order and said outputting of the print sheets such that print sheets of the same customer order are output to the collecting station without intermediate print sheet of another customer order.

11. Parallel print processing method for a photographic laboratory comprising the steps of:

a) receiving at least two webs, each web bearing a plurality of photographic prints, wherein prints of the same customer order may be present on different ones of the received webs and photographic prints of the same customer order being arranged on the webs in respective web sequences without intermediate photographic print of another customer order;

b) feeding the webs to at least two cutters, each cutter for cutting one of the received webs;

c) cutting the webs by the at least two cutters into print sheets;

d) feeding the print sheets to a collecting station;

characterised in that the feeding and the cutting of the webs is performed such that print sheets of the same customer order and cut by the at least two cutters arrive at the collector without an intermediate print sheet of an other customer order.

* * * * *